Feb. 10, 1959  H. F. BROGDON  2,872,828
VARIABLE SPEED WASHING MACHINE TRANSMISSION
Filed June 6, 1956  2 Sheets-Sheet 1

INVENTOR.
HAROLD F. BROGDON.
BY
ATTORNEYS.

Feb. 10, 1959 H. F. BROGDON 2,872,828
VARIABLE SPEED WASHING MACHINE TRANSMISSION
Filed June 6, 1956 2 Sheets-Sheet 2

INVENTOR.
HAROLD F. BROGDON
BY
ATTORNEYS.

United States Patent Office 2,872,828
Patented Feb. 10, 1959

2,872,828

VARIABLE SPEED WASHING MACHINE TRANSMISSION

Harold F. Brogdon, Cincinnati, Ohio, assignor, by mesne assignments, to Philco Corporation, Philadelphia, Pa., a corporation of Pennsylvania Application June 6, 1956, Serial No. 589,794

4 Claims. (Cl. 74—368)

The present invention relates to a variable speed transmission for use in washing machines and the like and, more particularly, to a transmission of this type which is adapted for automatic control incorporating a means for cushioning the shock attendant upon change of gear ratio.

It is an object of the present invention to provide a novel variable speed transmission which is efficient and reliable in operation and simple and economical in construction.

It is another object to provide such a transmission having a resilient coupling arranged to yield under overload incident to the shift from a low gear ratio to a high gear ratio.

The novel features that are considered characteristic of this invention are set forth in the appended claims; the invention itself, however, both as to its organization and method of operation, together with additional objects and advantages thereof, will best be understood from the following description of specific embodiments when read in conjunction with the accompanying drawings, in which:

Figure 1:
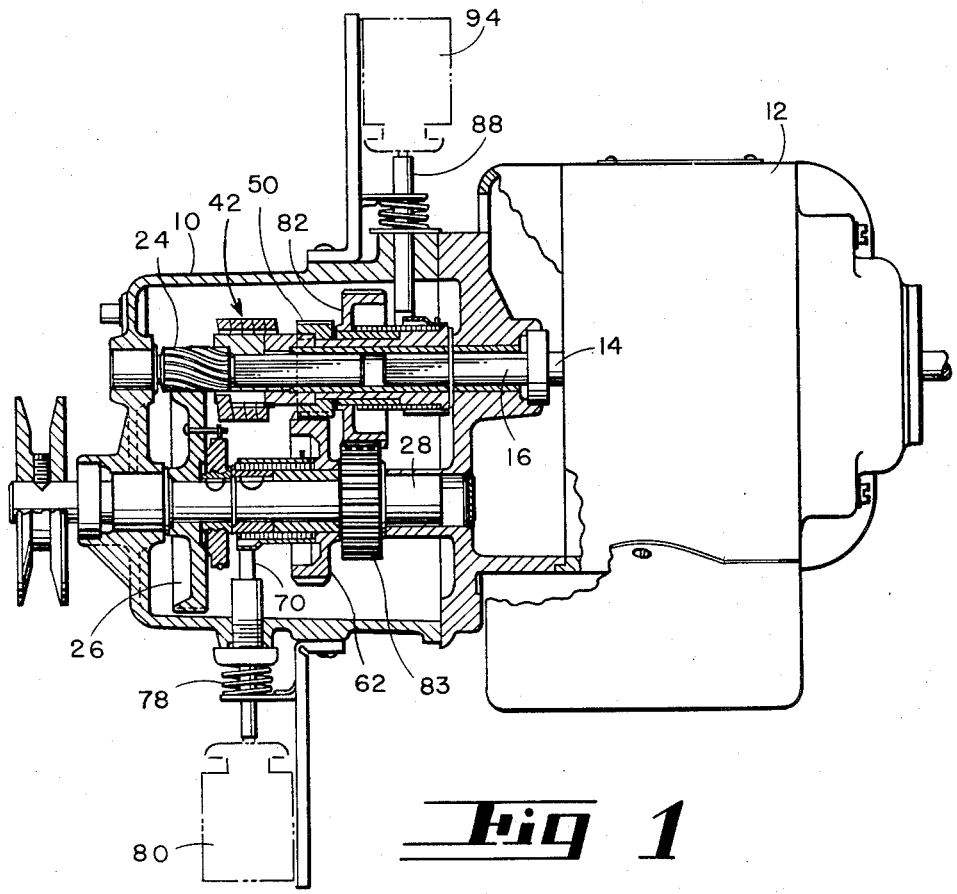
Figure 1 is a side elevation in-section of a preferred embodiment of the invention.
Figure 3:
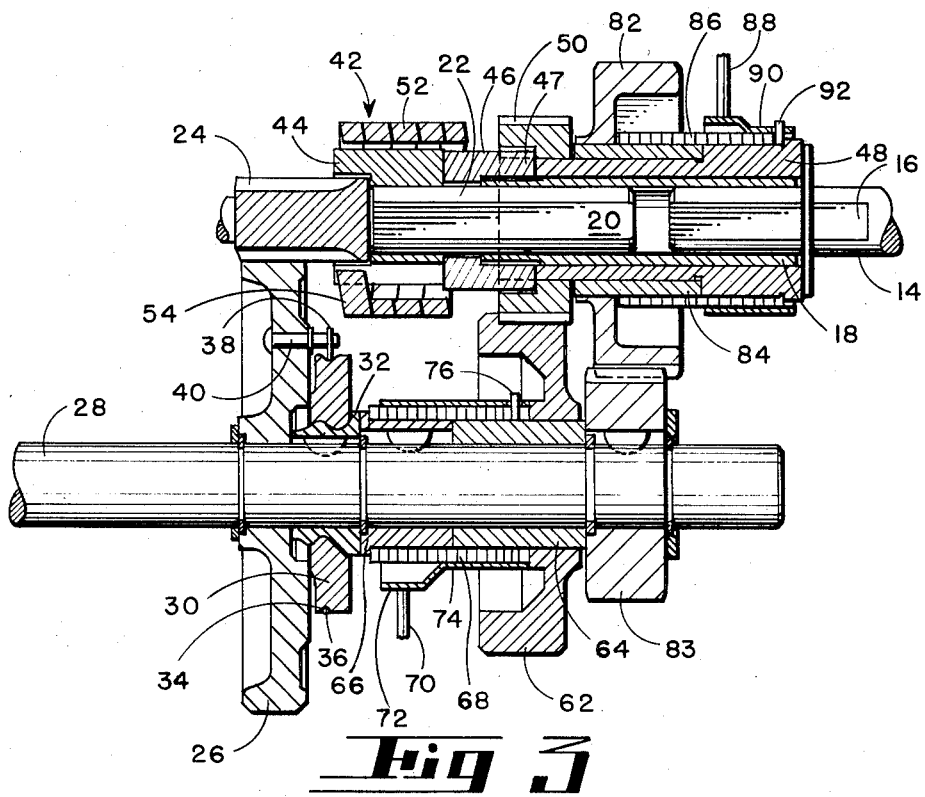
Figure 3 is an enlarged side elevation in-section of the transmission proper, deleting the housing and drive motor.

In Figures 1 and 3 of the drawing there is illustrated a transmission as contained in a housing 10 which is secured to an electric motor 12 having a power shaft 14 which is provided for a portion of its length with a "double-D" section 16 on which a coupling sleeve 18 is slidably but non-rotatably mounted.

Coupling sleeve 18 is formed with a hollow "double-D" section throughout its length for providing driving connection with power shaft 14 at one end and conforming with and slidably receiving the correspondingly formed end 20 of a driving shaft 22. The opposite end of driving shaft 22 is formed with gear teeth constituting a low speed drive pinion 24 which is adapted to mesh with a low speed driven gear 26 journaled on a driven shaft 28 located parallel to the driving shaft 22.

An over-running clutch connection from the driven gear 26 to the driven shaft 28 is provided, comprising a clutch nut 30 threaded on a screw shaft 32 fixedly mounted on the driven shaft, the inclination of the thread of the screw being such that the adjacent surface of the driven gear and clutch nut are brought into clamping engagement by the screw-jack action of the screw shaft and nut when driving torque is transmitted through the clutch nut in one direction. In order to initiate such driving engagement, the clutch nut is provided with a peripheral groove 34 in which a split spring ring 36 is frictionally mounted, said ring having a loop 38 at the leading end. A pin 40, fixedly mounted in the driven gear 26, is arranged to engage the loop 38 of spring 36, and causes the spring to drive the clutch nut 30 into clamping engagement with the gear. Thus, when driven gear 26, which rotates continuously when driving shaft 16 is rotating, is rotating faster than driven shaft 28, the over-running clutch will form a driving connection between the gear and shaft. Whereas, if the driven shaft 28 is rotated faster than gear 26, as by the intermediate or high speed gearing hereinafter described, the inclination of the threads of screw shaft 32 will cause the clutch nut to back off out of clamping engagement with the adjacent face of gear 26.

Figure 2:
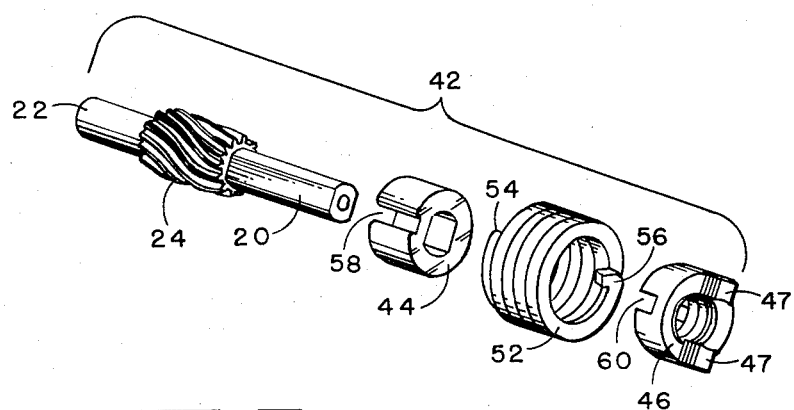
Figure 2 is an enlarged, exploded view of the components comprising the resilient coupling.

There is provided a resilient, shock-absorbing connection generally indicated at 42 and illustrated in the exploded view, Figure 2, between the driving shaft and the intermediate speed driving gears and the driving sleeve comprising a driving collar 44 formed with a hollow "double-D" section conforming with the correspondingly formed end 20 of the driving shaft 22 and positioned thereon adjacent the end formed with gear teeth. A male claw clutch member 46 is rotatably journaled on the driving shaft 22 between collar 44 and coupling sleeve 18 having rectangular teeth 47 projecting axially to engage mating recesses in the adjacent end of driving sleeve 48 and intermediate driving gear 50. Intermediate driving gear 50 is integrally connected to driving sleeve 48 which is rotatably journaled on coupling sleeve 18. A helical spring 52 is provided, loosely surrounding driving collar 44 and having inturned ends 54 and 56 to engage recesses 58 and 60 in the periphery of the driving collar 44 and clutch member 46, respectively, to form a resilient shock-absorbing connection therebetween.

The intermediate driving gear 50 is arranged to mesh with the intermediate driven gear 62 journaled on driven shaft 28. Gear 62 has a smooth, cylindrical hub 64 formed thereon or integrally connected thereto, and a cylindrical sleeve 66 positioned adjacent the hub 64 and having the same external diameter, rigidly mounted on the driven shaft. Means for connecting the gear 62 to rotate the driven shaft is provided in the form of a coiled spring clutch member 68 which surrounds the cylindrical surface of the hub 64 and sleeve 66, and is arranged to wrap down and grip the surfaces when torque is transmitted from the gear to the sleeve. The spring member 68 is held out of clutch engagement when it is not desired to transmit torque therethrough by means of a pin 70 which is movable into engagement with lug 72 on sleeve 74 loosely surrounding clutch spring 68. The clutch spring has an out-turned end 76 engaging in sleeve 74 whereby, when the rotation of sleeve 74 is prevented by pin 70, the driving end of the clutch spring is arrested and hub 64 of gear 62 is consequently permitted to rotate freely. Spring 78 normally urges pin 70 (Figure 1) into the sleeve-restraining position, and solenoid 80 is provided for withdrawing the pin when it is desired to render the intermediate gear operative.

A high speed driving gear 82 is journaled on an intermediate portion of driving sleeve 48 and is arranged to mesh with high speed driven pinion 83 fixed on driven shaft 28. Gear 82 is provided with cylindrical hub 84 formed thereon or integrally connected thereto, and driving sleeve 48 is formed with a cylindrical enlargement, adjacent hub 84, having the same external diameter. Spring clutch element 86 is arranged to form a driving connection from sleeve 48 to gear 82 when permitted by withdrawal of pin 88 from engagement with sleeve 90 connected with driving end 92 of the spring clutch. Such withdrawal of pin 88 may be effected by a second solenoid 94 (Figure 1) similar to solenoid 80.

In operation, rotation of power shaft 14 is transmitted through coupling sleeve 18, which correspondingly rotates driving shaft 22. If clutch springs 68 and 86 are held out of engagement by the corresponding control pins 70 and 88, low speed gear 26 is rotated by driving pinion 24, transmitting torque through over-running clutch 30, 32 to driven shaft 28, which consequently rotates at low speed. When it is desired to operate at the intermediate speed, energization of solenoid 80 causes withdrawal of pin 70, permitting clutch sleeve 74 to connect intermediate driven gear 62 to driven shaft 28, which is consequently rotated by gear 50 at the intermediate speed while the over-running clutch 30, 32 is automatically disengaged by the acceleration of the screw shaft 32.

Although the engagement of clutch spring 68 is frictional in character, it takes place quickly and positively, due to the wrap-down action of the clutch spring. Since the rotating parts of the motor and transmission and of the elements to be operated by driven shaft 28 have considerable inertia, this sudden change of driving gear ratio places a heavy momentary load on the transmission which substantially exceeds the normal driving torque. This excessive torque between shaft 14 and gear 50 causes spring 52 of the resilient connection 42 to wind down or tighten, absorbing this heavy impact load, and provides a time interval for acceleration of the driven shaft after which the spring will return to its normal position.

When it is desired to operate at high speed solenoid 94 is energized, withdrawing pin 88 which permits the clutch spring 86 to drive high speed gear 82, which thereupon rotates pinion 83 and driven shaft 28 at high speed. It will be noted that it is not necessary to return pin 70 of the intermediate gearing to the position of restraining sleeve 70, since the higher speed of shaft 28 carrying sleeve 66 with it will cause coupling spring 68 to unwrap and release driving connection between this sleeve and the hub of intermediate driven gear 62. The shock attendant upon energizing of clutch sleeve 86 is cushioned in the same manner by resilient connection 42 as above described, since spring 52 provides the connection between shaft 14 and gear 82.

The various features and advantages of the design and construction disclosed are thought to be clear from the foregoing description. Various other features and advantages not specifically enumerated will undoubtedly occur to those versed in the art, as likewise will many variations and modifications of the preferred embodiment of the invention illustrated, all of which may be achieved without departing from the spirit and scope of the invention.

What is claimed is:

1. In a variable speed transmission, a driving shaft, a first driving gear rotated by said driving shaft, a sleeve rotatably journaled on said driving shaft, a second driving gear journaled on said sleeve, a third driving gear rotatably journaled on said sleeve, means for selectively connecting said third driving gear to said sleeve in driving relationship, a driven shaft spaced from and parallel to said driving shaft, a first driven gear rotatably journaled on said driven shaft and positioned for meshing engagement with said first driving gear, means for connecting said first driven gear to said driven shaft in driving relationship, a second driven gear rotatably journaled on said driven shaft and positioned for meshing engagement with said second driving gear, means for selectively connecting said second driven gear to said driven shaft for driving engagement, a third driven gear splined to said driven shaft and meshing with said third driving gear, and a coupling device interposed between said driving shaft and sleeve, said device including a single yieldable, resilient member drivingly interconnecting said driving shaft and said sleeve and also drivingly interconnecting said driving shaft and second driving gear.

2. A variable speed transmission, as set forth in claim 1, in which the first and third means comprise self-tightening clutches for selectively connecting said third driving gear to said sleeve and said second driven gear to said driven shaft and separately operable means for initiating the closure of each clutch.

3. A variable speed transmission, as set forth in claim 2, in which the second meanes comprises an over-running clutch to connect said first driven gear to said driven shaft when the rotational speed of said shaft is less than that of said gear, and to disconnect the gear from the shaft when the latter's relational speed exceeds that of the gear.

4. A variable speed transmission, as set forth in claim 1, in which the yieldable resilient member is in the form of a helical spring, one end of which is secured to said driving shaft and the other end secured to said sleeve and said second driving gear co-jointly.

References Cited in the file of this patent

UNITED STATES PATENTS

| | | |
|---|---|---|
| 1,861,931 | Moldenhauer | June 7, 1932 |
| 2,039,451 | Richards | May 5, 1936 |
| 2,510,653 | Pepper | June 6, 1950 |
| 2,551,739 | Harlan | May 8, 1951 |
| 2,725,758 | Dickey | Dec. 6, 1955 |

FOREIGN PATENTS

| | | |
|---|---|---|
| 112,158 | Germany | Aug. 13, 1900 |